(12) United States Patent
Wood et al.

(10) Patent No.: US 9,367,564 B2
(45) Date of Patent: Jun. 14, 2016

(54) DYNAMIC GROUPING OF DOMAIN OBJECTS VIA SMART GROUPS

(75) Inventors: Stephen Bart Wood, Lehi, UT (US); Neal L. Adair, Sugar Land, TX (US); Timothy A. Chartrand, Spring, TX (US); Kelly G. Walker, Sugar Land, TX (US); Alan R. Wild, Humble, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 47 days.

(21) Appl. No.: 13/519,107

(22) PCT Filed: Dec. 3, 2010

(86) PCT No.: PCT/US2010/058915
§ 371 (c)(1),
(2), (4) Date: Jun. 25, 2012

(87) PCT Pub. No.: WO2011/112221
PCT Pub. Date: Sep. 15, 2011

(65) Prior Publication Data
US 2012/0331412 A1 Dec. 27, 2012

Related U.S. Application Data

(60) Provisional application No. 61/313,481, filed on Mar. 12, 2010.

(51) Int. Cl.
*G06F 3/048* (2013.01)
*G06F 17/30* (2006.01)

(52) U.S. Cl.
CPC .............................. *G06F 17/30241* (2013.01)

(58) Field of Classification Search
CPC ..... G06F 8/71; G06F 17/30241; E21B 44/00; E21B 44/005; E21B 43/00; G06Q 10/06; C10G 1/008
USPC ................................ 715/771; 703/2; 717/116
See application file for complete search history.

(56) References Cited

U.S. PATENT DOCUMENTS

| | | |
|---|---|---|
| 4,794,534 A | 12/1988 | Millheim |
| 5,992,519 A | 11/1999 | Ramakrishnan et al. |
| 6,002,985 A | 12/1999 | Stephenson |
| 6,035,255 A | 3/2000 | Murphy et al. |
| 6,044,328 A | 3/2000 | Murphy et al. |
| 6,049,758 A | 4/2000 | Bunks et al. |
| 6,070,125 A | 5/2000 | Murphy et al. |
| 6,101,447 A | 8/2000 | Poe, Jr. |

(Continued)

FOREIGN PATENT DOCUMENTS

| | | |
|---|---|---|
| CA | 2312381 | 11/2009 |
| EP | 1036341 | 11/1998 |
| EP | 1230566 | 11/2000 |
| WO | WO 03/072907 | 9/2003 |
| WO | WO 03/078794 | 9/2003 |
| WO | WO 2007/076044 | 7/2007 |

(Continued)

OTHER PUBLICATIONS

Dynamic Grouping of Domain Objects Via Smart Groups, Research Disclosure Database #542040, ISDN 0374-4353, Jun. 2009.

*Primary Examiner* — Jeffrey A Gaffin
*Assistant Examiner* — Justin Lee
(74) *Attorney, Agent, or Firm* — ExxonMobil Upstream Research Company, Law Dept.

(57) ABSTRACT

A method of organizing a first group of domain objects relating to hydrocarbon management is disclosed. User-defined logic conditions are established. A plurality of the domain objects in the first group of domain objects are selected. It is determined whether any of the selected plurality of domain objects satisfies the logic conditions. A second group of domain objects is created that includes the logic conditions and a list of the domain objects satisfying the logic conditions. An operation command is performed on the second group of domain objects such that the operation command is performed on all domain objects listed in the second group of domain objects.

17 Claims, 13 Drawing Sheets

(56) References Cited

U.S. PATENT DOCUMENTS

| | | |
|---|---|---|
| 6,195,092 B1* | 2/2001 | Dhond et al. ............... 715/763 |
| 6,236,942 B1 | 5/2001 | Bush |
| 6,236,994 B1 | 5/2001 | Swartz et al. |
| 6,353,437 B1 | 3/2002 | Gagne |
| 6,356,844 B2 | 3/2002 | Thomas et al. |
| 6,438,069 B1 | 8/2002 | Ross et al. |
| 6,438,269 B1* | 8/2002 | Kim ............... G06F 17/30241 382/260 |
| 6,519,568 B1 | 2/2003 | Harvey et al. |
| 6,529,833 B2 | 3/2003 | Fanini et al. |
| 6,549,854 B1 | 4/2003 | Malinverno et al. |
| 6,612,382 B2 | 9/2003 | King |
| 6,715,551 B2 | 4/2004 | Curtis et al. |
| 6,757,613 B2 | 6/2004 | Chapman et al. |
| 6,772,066 B2 | 8/2004 | Cook |
| 6,826,483 B1 | 11/2004 | Anderson et al. |
| 6,829,570 B1 | 12/2004 | Thambynayagam et al. |
| 6,940,507 B2 | 9/2005 | Repin et al. |
| 6,978,210 B1 | 12/2005 | Suter et al. |
| 6,980,940 B1 | 12/2005 | Gurpinar et al. |
| 7,031,842 B1 | 4/2006 | Musat et al. |
| 7,047,170 B2 | 5/2006 | Feldman et al. |
| 7,047,517 B1 | 5/2006 | Brown et al. |
| 7,054,752 B2 | 5/2006 | Zabalza-Mezghani et al. |
| 7,079,953 B2 | 7/2006 | Thorne et al. |
| 7,085,696 B2 | 8/2006 | King |
| 7,089,167 B2 | 8/2006 | Poe |
| 7,109,717 B2 | 9/2006 | Constable |
| 7,181,380 B2 | 2/2007 | Dusterhoft et al. |
| 7,225,078 B2 | 5/2007 | Shelley et al. |
| 7,257,571 B2 | 8/2007 | Turski et al. |
| 7,278,496 B2 | 10/2007 | Leuchtenberg |
| 7,281,213 B2 | 10/2007 | Callegari |
| 7,283,941 B2 | 10/2007 | Horowitz et al. |
| 7,328,107 B2 | 2/2008 | Strack et al. |
| 7,337,067 B2 | 2/2008 | Sanstrom |
| 7,340,347 B2 | 3/2008 | Shray et al. |
| 7,359,915 B1 | 4/2008 | Bush |
| 7,367,411 B2 | 5/2008 | Leuchtenberg |
| 7,437,358 B2 | 10/2008 | Arrouye et al. |
| 7,451,066 B2 | 11/2008 | Edwards et al. |
| 7,460,957 B2 | 12/2008 | Prange et al. |
| 7,478,024 B2 | 1/2009 | Gurpinar et al. |
| 7,539,625 B2 | 5/2009 | Klumpen et al. |
| 7,542,037 B2 | 6/2009 | Fremming |
| 7,548,873 B2 | 6/2009 | Veeningen et al. |
| 7,596,481 B2 | 9/2009 | Zamora et al. |
| 7,603,264 B2 | 10/2009 | Zamora et al. |
| 7,614,015 B2 | 11/2009 | Whalen et al. |
| 7,627,430 B2 | 12/2009 | Hawtin |
| 7,630,914 B2 | 12/2009 | Veeningen et al. |
| 7,657,414 B2 | 2/2010 | Zamora et al. |
| 7,657,494 B2 | 2/2010 | Wilkinson et al. |
| 7,672,825 B2 | 3/2010 | Brouwer et al. |
| 7,684,929 B2 | 3/2010 | Prange et al. |
| 7,716,029 B2 | 5/2010 | Couet et al. |
| 7,725,302 B2 | 5/2010 | Ayan et al. |
| 7,739,089 B2 | 6/2010 | Gurpinar et al. |
| 7,752,022 B2 | 7/2010 | Fornel et al. |
| 7,778,811 B2 | 8/2010 | Kelfoun |
| 7,796,468 B2 | 9/2010 | Kellogg |
| 7,809,537 B2 | 10/2010 | Hemanthkumar et al. |
| 7,814,989 B2 | 10/2010 | Nikolakis-Mouchas et al. |
| 7,876,705 B2 | 1/2011 | Gurpinar et al. |
| 7,878,268 B2 | 2/2011 | Chapman et al. |
| 7,899,657 B2 | 3/2011 | Martin |
| 7,913,190 B2 | 3/2011 | Grimaud et al. |
| 7,925,483 B2 | 4/2011 | Xia et al. |
| 7,953,585 B2 | 5/2011 | Gurpinar et al. |
| 7,953,587 B2 | 5/2011 | Bratton et al. |
| 7,970,545 B2 | 6/2011 | Sanstrom |
| 7,986,319 B2 | 7/2011 | Dommisse et al. |
| 7,991,600 B2 | 8/2011 | Callegari |
| 7,995,057 B2 | 8/2011 | Chuter |
| 8,199,166 B2 | 6/2012 | Repin et al. |
| 8,301,426 B2 | 10/2012 | Abasov et al. |
| 8,381,815 B2 | 2/2013 | Karanikas et al. |
| 8,447,525 B2 | 5/2013 | Pepper et al. |
| 8,775,141 B2 | 7/2014 | Raphael |
| 2001/0042642 A1 | 11/2001 | King |
| 2002/0049575 A1 | 4/2002 | Jalali et al. |
| 2002/0067373 A1 | 6/2002 | Roe et al. |
| 2003/0105765 A1* | 6/2003 | Smith ............... G06F 17/30705 |
| 2005/0199391 A1 | 9/2005 | Cudmore et al. |
| 2006/0085174 A1 | 4/2006 | Hemanthkumar et al. |
| 2006/0092766 A1 | 5/2006 | Shelley et al. |
| 2006/0265508 A1* | 11/2006 | Angel et al. ............... 709/230 |
| 2007/0156340 A1 | 7/2007 | Shray et al. |
| 2007/0156377 A1 | 7/2007 | Gurpinar et al. |
| 2007/0199721 A1 | 8/2007 | Givens et al. |
| 2007/0213935 A1 | 9/2007 | Fagnou et al. |
| 2007/0266082 A1 | 11/2007 | McConnell et al. |
| 2008/0077371 A1* | 3/2008 | Yeten et al. ............... 703/10 |
| 2008/0088621 A1 | 4/2008 | Grimaud et al. |
| 2008/0092109 A1 | 4/2008 | Kinnucan, Jr. et al. |
| 2008/0109490 A1 | 5/2008 | Arnegaard et al. |
| 2008/0120076 A1 | 5/2008 | Thambynayagam et al. |
| 2008/0165185 A1 | 7/2008 | Smith et al. |
| 2008/0165186 A1 | 7/2008 | Lin |
| 2008/0288473 A1* | 11/2008 | Hu ............... G06F 17/30522 |
| 2008/0306803 A1 | 12/2008 | Vaal et al. |
| 2009/0024443 A1* | 1/2009 | Graham et al. ............... 705/9 |
| 2009/0027380 A1 | 1/2009 | Rajan et al. |
| 2009/0027385 A1 | 1/2009 | Smith |
| 2009/0070086 A1 | 3/2009 | Le Ravalec et al. |
| 2009/0089028 A1 | 4/2009 | Sagert et al. |
| 2009/0095479 A1* | 4/2009 | Karanikas et al. ............ 166/303 |
| 2009/0125362 A1 | 5/2009 | Reid et al. |
| 2009/0157367 A1 | 6/2009 | Meyer et al. |
| 2009/0157590 A1 | 6/2009 | Mijares et al. |
| 2009/0182541 A1 | 7/2009 | Crick et al. |
| 2009/0200014 A1 | 8/2009 | Schottle et al. |
| 2009/0222742 A1 | 9/2009 | Pelton et al. |
| 2009/0229819 A1 | 9/2009 | Repin et al. |
| 2009/0240564 A1* | 9/2009 | Boerries et al. ............... 705/10 |
| 2009/0254585 A1 | 10/2009 | Akers et al. |
| 2009/0299709 A1 | 12/2009 | Liu |
| 2009/0303233 A1 | 12/2009 | Lin et al. |
| 2009/0319243 A1 | 12/2009 | Suarez-Rivera et al. |
| 2010/0013831 A1 | 1/2010 | Gilje et al. |
| 2010/0070463 A1* | 3/2010 | Zhao ............... G06Q 10/06 707/608 |
| 2010/0125349 A1 | 5/2010 | Abasov et al. |
| 2010/0132450 A1 | 6/2010 | Pomerantz et al. |
| 2010/0145931 A1* | 6/2010 | Chang ............... G06F 17/30241 707/715 |
| 2010/0161292 A1 | 6/2010 | Shook et al. |
| 2010/0161300 A1 | 6/2010 | Yeten et al. |
| 2010/0169018 A1 | 7/2010 | Brooks |
| 2010/0174489 A1 | 7/2010 | Bryant et al. |
| 2010/0179797 A1 | 7/2010 | Cullick et al. |
| 2010/0185395 A1 | 7/2010 | Pirovolou et al. |
| 2010/0271232 A1 | 10/2010 | Clark et al. |
| 2010/0286917 A1 | 11/2010 | Hazlett et al. |
| 2010/0299125 A1 | 11/2010 | Ding et al. |
| 2010/0307742 A1 | 12/2010 | Phillips et al. |
| 2011/0022435 A1 | 1/2011 | Reid et al. |
| 2011/0040533 A1 | 2/2011 | Torrens et al. |
| 2011/0040536 A1 | 2/2011 | Levitan |
| 2011/0060572 A1 | 3/2011 | Brown et al. |
| 2011/0106514 A1 | 5/2011 | Omeragic et al. |
| 2011/0157235 A1 | 6/2011 | FitzSimmons |
| 2011/0161133 A1 | 6/2011 | Staveley et al. |
| 2011/0168391 A1 | 7/2011 | Saleri et al. |
| 2011/0175899 A1 | 7/2011 | Bittar et al. |
| 2014/0005107 A1* | 1/2014 | Tso et al. ............... 514/6.9 |

FOREIGN PATENT DOCUMENTS

| | | |
|---|---|---|
| WO | WO 2007/100703 | 9/2007 |
| WO | WO 2010/134807 | 11/2010 |
| WO | WO 2010/141038 | 12/2010 |

* cited by examiner

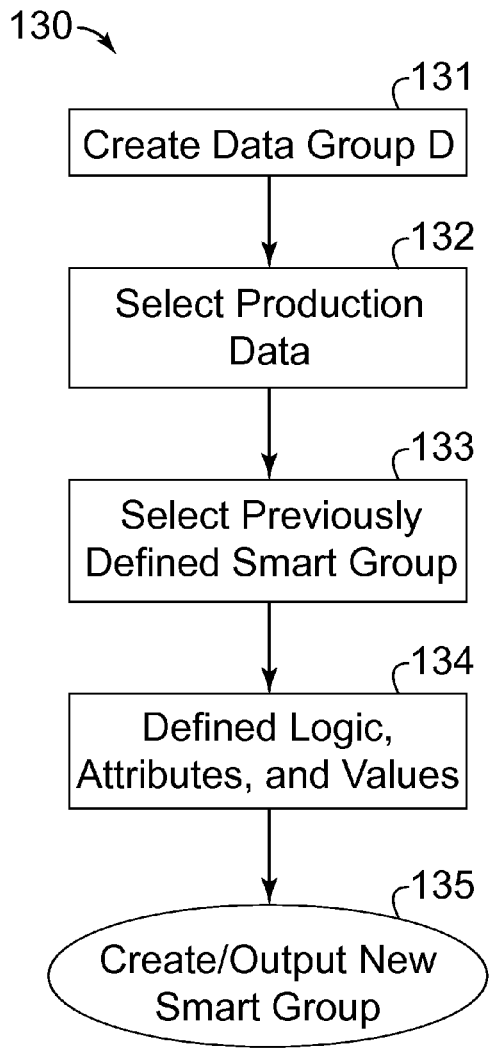
*Figure 13*
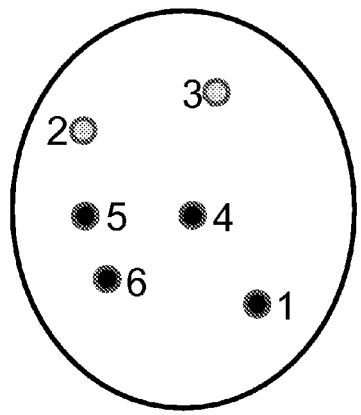
*Figure 14*
| Smart Group D Oil Production |
|---|
| Well 1 – 120 MBO |
| Well 2 – 85 MBO |
| Well 3 – 50 MBO |
| Well 4 – 225 MBO |
| Well 5 – 170 MBO |
| Well 6 – 130 MBO |
*Figure 15*

DYNAMIC GROUPING OF DOMAIN OBJECTS VIA SMART GROUPS

CROSS-REFERENCE TO RELATED APPLICATION

This application is the National Stage of International Application No. PCT/US2010/058915, that published as WO 2011/112221, filed 3 Dec. 2010, which claims the benefit of U.S. Provisional Application No. 61/313,481, filed on 3 Mar. 2010, each of which is incorporated herein by reference, in its entirety, for all purposes.

TECHNICAL FIELD

Disclosed aspects and methodologies generally relate to computing, and more particularly, to dynamically organizing and updating domain objects within a software application.

BACKGROUND

This section is intended to introduce various aspects of the art, which may be associated with aspects of the disclosed techniques and methodologies. A list of references is provided at the end of this section and may be referred to hereinafter. This discussion, including the references, is believed to assist in providing a framework to facilitate a better understanding of particular aspects of the disclosure. Accordingly, this section should be read in this light and not necessarily as admissions of prior art.

Many software applications maintain several types of domain objects. A domain object is a representation of a portion of a real world concept residing within a software application's memory. In the field of oil and gas exploration and production, a domain object could represent a wellbore, a well completion, a well log, a well core, tubulars, a surface, a three-dimensional model, a seismic cube, a three dimensional surface, a well zone, a point, a point set, a polyline, hydrocarbon management data such as production data, etc. Associated with these domain objects are metadata that contain information about the domain object, in addition to any data associated with the actual domain object itself.

Software applications can maintain thousands of domain objects in lists that end users can graphically interact with, but since manually navigating large graphical lists can be prohibitively tedious, applications often organize domain objects automatically into subgroups to simplify the navigation process. Typically subgroups are organized by metadata type. For example, domain objects of metadata type "wellbore" would be organized into a wellbore subgroup. Some applications also allow users to organize data into custom defined subgroups, which may be referred to as folders. These user defined subgroups are maintained and organized by the user with minimal assistance from the software application. For example, a user might want to organize all wellbores existing in a specific reservoir fault block into a unique subgroup. If the user creates a new wellbore in the same fault block it is the user's responsibility to add the newly created wellbore domain object into the fault block's corresponding unique subgroup. The application does not assist the user in this updating process by automatically adding the new wellbore to the appropriate subgroup. This type of organization strategy is common in most current applications, and the burden of maintaining organization is placed on the user. An increase in the number of oil and gas related domain objects to be tracked drives a corresponding increased need to improve how these data are organized to improve worker efficiency.

Related publications include U.S. Pat. Nos. 7,359,915 and 6,353,437. The '437 patent, titled "Animation System and Method for Defining and using Rule-based Groups of Objects" discloses a method that performs an organizational function for animated objects in the creation of movies and computer games. The method of the '437 patent manages objects for animated objects present in "scenes" located in computer software "animation windows." All the affected objects are therefore referenced to frame number, frame sequence or run-time, and not to real world spatial coordinates. What is needed is a way to link oil and gas-related domain objects associated with real-world spatial coordinates. More specifically, what is needed is a way to place domain objects within subgroups dynamically utilizing information about the object or relationships between objects.

SUMMARY

In one aspect, a computer-implemented method of organizing a first group of domain objects relating to hydrocarbon management is disclosed. One or more user-defined logic conditions are generated. A plurality of the domain objects in the first group of domain objects are selected. It is determined whether any of the selected plurality of domain objects satisfies the logic conditions. A second group of domain objects is created that includes the logic conditions and a list of the domain objects satisfying the logic conditions. An operation command is performed on the second group of domain objects such that the operation command is performed on all domain objects listed in the second group of domain objects.

The logic conditions may be first logic conditions, and the selected plurality of domain objects may be a first selected plurality of domain objects. One or more user-defined second logic conditions may be established. A second plurality of domain objects in the first group of domain objects may be selected. It may be determined whether any of the second selected plurality of domain objects satisfies the second logic conditions. A third group of domain objects may be created that includes the second logic conditions and a list of the domain objects satisfying the second logic conditions. The logic conditions may include a spatial requirement, which may be at least one of proximity to a user-defined item, inclusion in a user-defined item, and intersection with a user-defined item. The domain objects may be one or more of a wellbore, a well completion, a well log, a well target, a well core, tubulars, a surface, a three-dimensional model, a seismic cube, a three-dimensional surface, a well zone, a point, a point set, a polyline, and hydrocarbon management data. The hydrocarbon management data may be hydrocarbon production data. Each of the domain objects in the first group of hydrocarbon-related domain objects may have an attribute associated therewith, and determining whether the one or more of the selected domain objects satisfies the logic conditions may include comparing an attribute value of each selected domain object with a requirement of the logic conditions.

According to other methodologies and techniques, it may be determined whether an additional domain object has been added to the first group of domain objects. The additional domain object may be included in the second group of domain objects when the additional domain object satisfies the logic conditions. The logic conditions may be first logic conditions, and the selected plurality of domain objects may be a first selected plurality of domain objects. User-defined second logic conditions may be established. A second plurality of the domain objects in the first group of domain objects may be selected. It may be determined whether any of the second selected plurality of domain objects satisfies the second logic conditions. A third group of domain objects may be created that includes the second logic conditions and a list of the domain objects satisfying the second logic conditions. The additional domain object may be included in the third group of domain objects when the additional domain object satisfies the second logic conditions. The second logic conditions may comprise inclusion in the second group of domain objects. The operation command may include one or more of deleting, renaming, displaying, and modifying any part of the domain objects in the second group of domain objects or information related thereto, such as displayed color, texture, size, style, and metadata. The logic conditions may include a time range.

In another aspect, a computer program product is provided having computer executable logic recorded on a tangible, machine readable medium. The computer program product includes: code for establishing user-defined logic conditions; code for selecting a plurality of domain objects in a first group of domain objects relating to hydrocarbon management; code for determining whether any of the selected plurality of domain objects satisfies the logic conditions; code for creating a second group of domain objects that includes the logic conditions and a list of the domain objects satisfying the logic conditions; code for performing an operation command on the second group of domain objects such that the operation command is performed on all domain objects listed in the second group of domain objects.

According to methodologies and techniques disclosed herein, the conditions may be first logic conditions, the selected plurality of domain objects are a first selected plurality of domain objects. The computer program product may further include code for establishing user-defined second logic conditions, code for selecting a second plurality of domain objects in the first group of domain objects; code for determining whether any of the second selected plurality of domain objects satisfies the second logic conditions, and code for creating a third group of domain objects that includes the second logic conditions and a list of the domain objects satisfying the second logic conditions. The computer program product may further include: code for determining whether an additional domain object has been added to the first group of domain objects; code for including the additional domain object in the second group of domain objects when the additional domain object satisfies the first second logic conditions; and code for including the additional domain object in the third group of domain objects when the additional domain object satisfies the second logic conditions.

In another aspect, a method of managing hydrocarbon resources is provided. A first group of domain objects relating to hydrocarbon management is obtained. User-defined logic conditions are established. A plurality of the domain objects in the first group of domain objects are selected. It is determined whether any of the selected plurality of domain objects satisfies the logic conditions. A second group of domain objects is created that includes the logic conditions and a list of the domain objects satisfying the logic conditions. An operation command is performed on the second group of domain objects such that the operation command is performed on all domain objects listed in the second group of domain objects.

According to methodologies and techniques disclosed herein, the logic conditions are first logic conditions, and the selected plurality of domain objects are a first selected plurality of domain objects. User-defined second logic conditions may be established. It may be determined whether any of the second selected plurality of domain objects satisfies the second logic conditions. A third group of domain objects may be created that includes the second logic conditions and a list of the domain objects satisfying the second logic conditions. The domain objects may include one or more of a wellbore, a well completion, a well log, a well target, a well core, tubulars, a surface, a three-dimensional model, a seismic cube, a three-dimensional surface, a well zone, a point, a point set, a polyline, and/or hydrocarbon management data.

BRIEF DESCRIPTION OF THE DRAWINGS

The foregoing and other advantages of the disclosed aspects and methodologies may become apparent upon reviewing the following detailed description and drawings of non-limiting examples of embodiments in which:

FIG. 13 is a flowchart showing a method of smart group creation with dynamic attributes;

FIG. 14 is a top plan view of a cross-section of a subsurface formation;

FIG. 15 is a chart showing oil production for a smart group;

DETAILED DESCRIPTION

Figure 1:
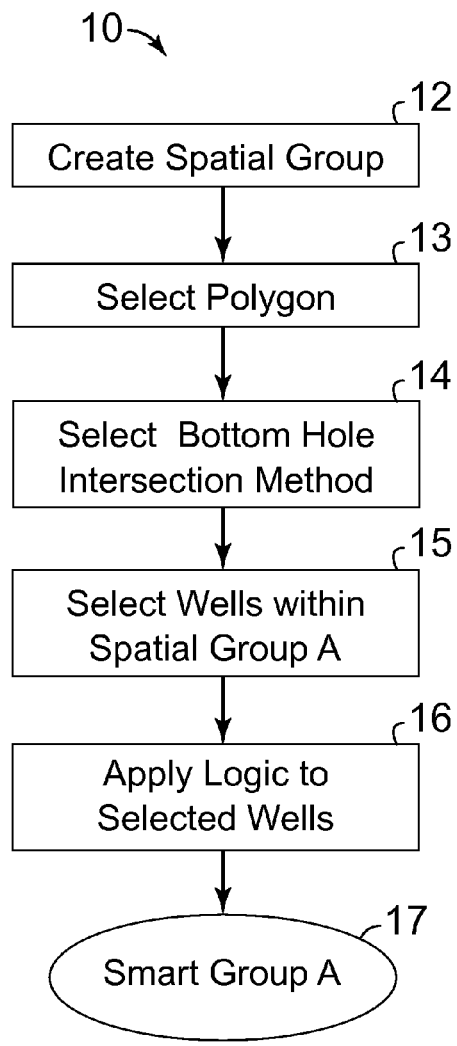
FIG. 1 is a flowchart showing a method of spatial smart group creation with polygons.

To the extent the following description is specific to a particular embodiment or a particular use, this is intended to be illustrative only and is not to be construed as limiting the scope of the invention. On the contrary, it is intended to cover all alternatives, modifications, and equivalents that may be included within the spirit and scope of the invention.

Some portions of the detailed description which follows are presented in terms of procedures, steps, logic blocks, processing and other symbolic representations of operations on data bits within a memory in a computing system or a computing device. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussions, terms such as "establishing", "selecting", "determining", "creating", "performing", "comparing", "including", "deleting", "renaming", "modifying", "providing", "outputting", "displaying", or the like, may refer to the action and processes of a computer system, or other electronic device, that transforms data represented as physical (electronic, magnetic, or optical) quantities within some electrical device's storage into other data similarly represented as physical quantities within the storage, or in transmission or display devices. These and similar terms are to be associated with the appropriate physical quantities and are merely convenient labels applied to these quantities.

Embodiments disclosed herein also relate to an apparatus for performing the operations herein. This apparatus may be specially constructed for the required purposes, or it may comprise a general-purpose computer selectively activated or reconfigured by a computer program or code stored in the computer. Such a computer program or code may be stored or encoded in a computer readable medium or implemented over some type of transmission medium. A computer-readable medium includes any medium or mechanism for storing or transmitting information in a form readable by a machine, such as a computer ('machine' and 'computer' are used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.).

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined.

As used herein, "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

As used herein, "exemplary" is used exclusively herein to mean "serving as an example, instance, or illustration." Any aspect described herein as "exemplary" is not necessarily to be construed as preferred or advantageous over other aspects.

As used herein, "intersect" may mean a physical intersection of two or more objects, such as a wellbore and an underground surface. In the context of smart group creation, "intersect" is a logic term expressing commonality of two or more elements or groups.

As used herein, "hydrocarbon reservoirs" include reservoirs containing any hydrocarbon substance, including for example one or more than one of any of the following: oil (often referred to as petroleum), natural gas, gas condensate, tar and bitumen.

As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, carbon sequestration activities, and any other hydrocarbon-related acts or activities.

As used herein, "machine-readable medium" refers to a medium that participates in directly or indirectly providing signals, instructions and/or data. A machine-readable medium may take forms, including, but not limited to, non-volatile media (e.g. ROM, disk) and volatile media (RAM). Common forms of a machine-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, EEPROM, or other memory chip or card, a memory stick, and other media from which a computer, a processor or other electronic device can read.

As used herein, "surface" may mean an above-ground or underground surface, such as an interface between two geologic formations. A surface may form part of an actual geologic formation or may be a virtual surface generated automatically or under the direction of a viewer of a subsurface model.

To address the deficiencies associated with manual user-defined groups of three-dimensional domain objects, and to allow users to easily work with multiple objects, a concept of smart groups is introduced herein. Smart groups allow users to use custom logic statements to categorize subset groups of domain objects based on a set of conditions. Specific conditions may include, but are not limited to spatial location (2D and 3D) of multiple domain objects, data associated with domain objects, metadata belonging to domain objects, logically linked domain objects, and the like. The logic statements used in their creation are stored with smart groups and can be saved and retrieved for later use.

A smart group includes a list of domain objects that match the smart group's logic as well as the logic used to create the smart group. Smart group results can also be dynamically updated on demand. Results can also be updated automatically when new domain objects are imported or created, attributes of domain objects are modified, or data linked to domain objects are changed. Therefore, once users define the logic of a smart group, the smart group's results can be automatically updated dynamically with little to no further effort on the part of the user. These features of smart groups are illustrated in the following examples.

Figure 2:
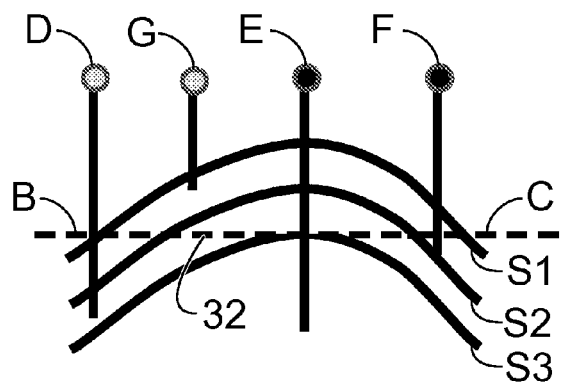
FIG. 2 is a side elevational view of a subsurface formation.
Figure 3:
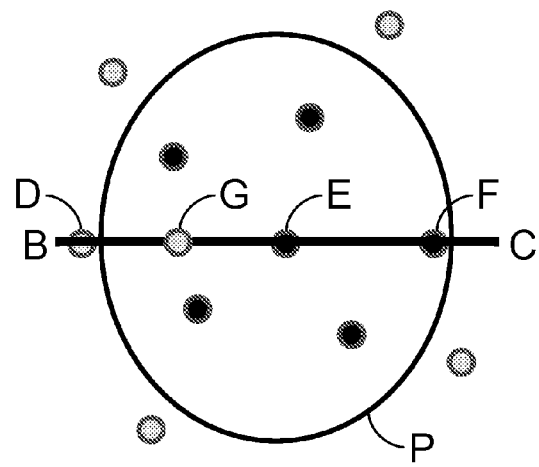
FIG. 3 is a top plan view of a cross-section of the subsurface formation of FIG. 2 taken along the line B-C.

FIGS. 1-3 show an example of creating a smart group based on the spatial location of multiple domain objects related to oil exploration or production, such as wellbores. In this example, a user desires to group together all wells whose bottom hole locations are within a certain region. FIG. 1 shows a method 10 for creating a smart group, which in this example is labeled smart group A. FIG. 3 shows a 2D top view of wellbore bottom hole locations. FIG. 2 shows a side elevational cross section. Line B-C has been selected to be coplanar with the oil/water contact (OWC) plane 32. Surfaces S1, S2 and S3 are shown, with surfaces S1 and S3 representing the top and base of an oil reservoir, respectively. Wells D, E, and F are three wells that intersect the OWC plane. Well G does not intersect the OWC plane.

Returning to FIG. 1, method 10 commences at block 12 when a user elects to create a spatial group comprising twelve wells whose bottom hole locations may be within a desired region. The user is presented with a dialog box on a computer screen or other display to select the name of the smart group to be created. At block 13 the user selects one or more logical conditions that, when applied to the spatial group of wells, may form a subset of the spatial group. This logical condition may be represented graphically by one or more polygons, polyhedra, or other geometric construct, such as polygon P, which in this example represents where OWC plane 32 meets surface S1. The logical condition may be any other spatial requirement, such as proximity to a user-defined item, inclusion in a user-defined item, and intersection with a user-defined item. At block 14 the user selects which well part or parts to consider for intersection with the selected polygon. Well parts that may be used include well tops, well bottoms, an arbitrary well segment, or all or any portion of the entire wellbore. At block 15 the user selects which of the wells in spatial group A to consider for potential inclusion in the smart group. At block 16 the smart group is created with the defined logic, which in this example can be phrased "all selected wells in spatial group A with bottom holes intersecting polygon P." The dark-colored circles in FIGS. 2 and 3 (such as wells E and F) represent wells that meet the defined logic and are included in smart group A, while the lighter-colored circles (such as wells D and G) represent wells that do not meet the defined logic and are not included in smart group A. At block 17 the user is presented with a list of wells that satisfy the logical conditions of smart group A. The list of smart group members and the logic to create the smart group may be stored for future reference. An operation command may be performed on the smart group. The operation command is performed on all members of the smart group. Examples of operation commands include deleting, renaming, displaying, and/or modifying any part of the domain objects in the smart group or the information related thereto. The information may include displayed color, texture, size, style, and/or metadata relating to a smart group member. Smart groups created by the method shown in FIGS. 1-3 may be used to identify wells associated with a platform, wells drilled within a defined fault block, wells penetrating one or more reservoirs, and the like.

Figure 4:
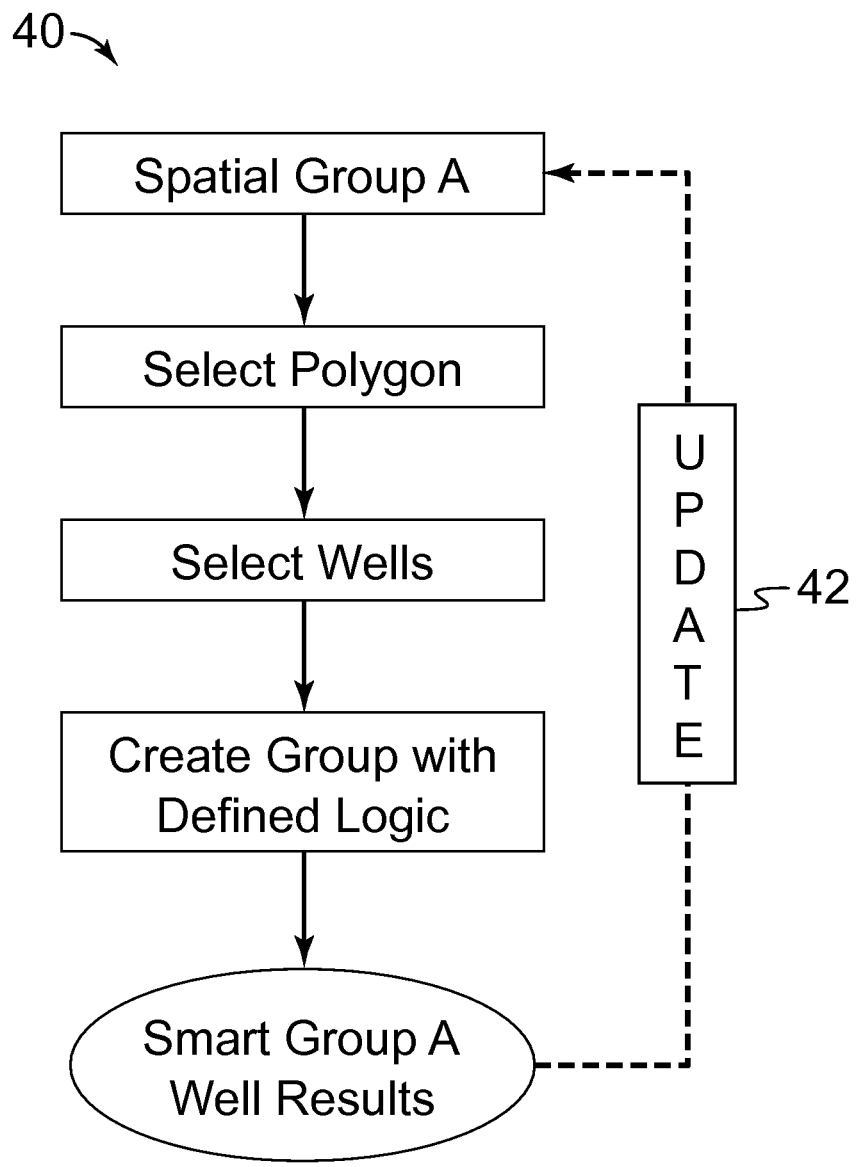
FIG. 4 is a flowchart showing a method of updating smart groups.
Figure 5:
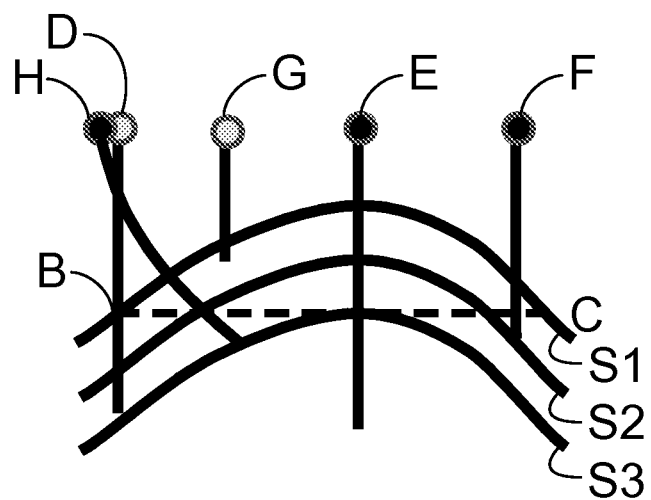
FIG. 5 is a side elevational view of a subsurface formation.
Figure 6:
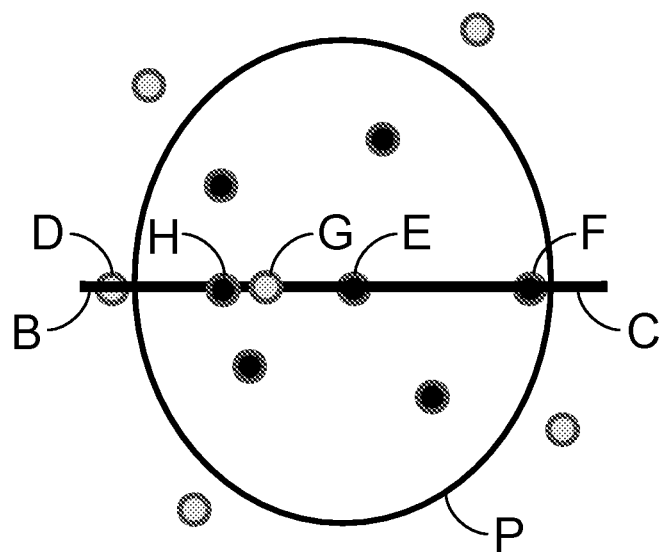
FIG. 6 is a top plan view of a cross-section of the subsurface formation of FIG. 5 taken along the line B-C.

As domain objects are added or modified within the application, smart groups can be updated dynamically based on the logic conditions saved with the smart groups. In this way, users are readily presented with an up-to-date representation of the membership in smart groups. Since the logic used in the creation of smart group A (FIG. 1) is stored with the smart group, when new wellbores are added or existing wells are modified, smart group A can be updated dynamically, either automatically or manually, to include the new or modified wellbores that satisfy the smart group logic conditions. A method 40 of updating a smart group is shown in FIG. 4. Method 40 is similar to method 10 in FIG. 1 with the added block 42 providing a dynamic updating of the smart group as described herein. FIGS. 5 and 6 show FIGS. 2 and 3 at a subsequent point in time, where an additional well H has been added to the original smart group A. When well H is imported into or created within the application, smart group A is updated dynamically, preferably as it is imported or created and without user intervention, and well H is included in smart group A because its wellbore bottom hole location falls within polygon P, therefore satisfying the logic used to create smart group A. Alternatively, if polygon P is modified, regenerating smart group A recalculates the intersections and modifies the wellbore group's population to be consistent with any polygon modification. Dynamically updating smart groups, as shown in the method of FIG. 4, can be useful to geoscientists and reservoir engineers, especially during the time of early development of a field, where wells are actively being drilled and new information is being acquired that adds additional detail and alters the construction of the 3D earth model. It can also be helpful in managing a mature oil and gas field, where production is in decline. As wells are depleted of hydrocarbons in a reservoir zone and need to be recompleted, dynamically grouping wells according to a set of predefined conditions simplifies the process of identifying potential wells to recomplete to restart hydrocarbon production.

Figure 7:
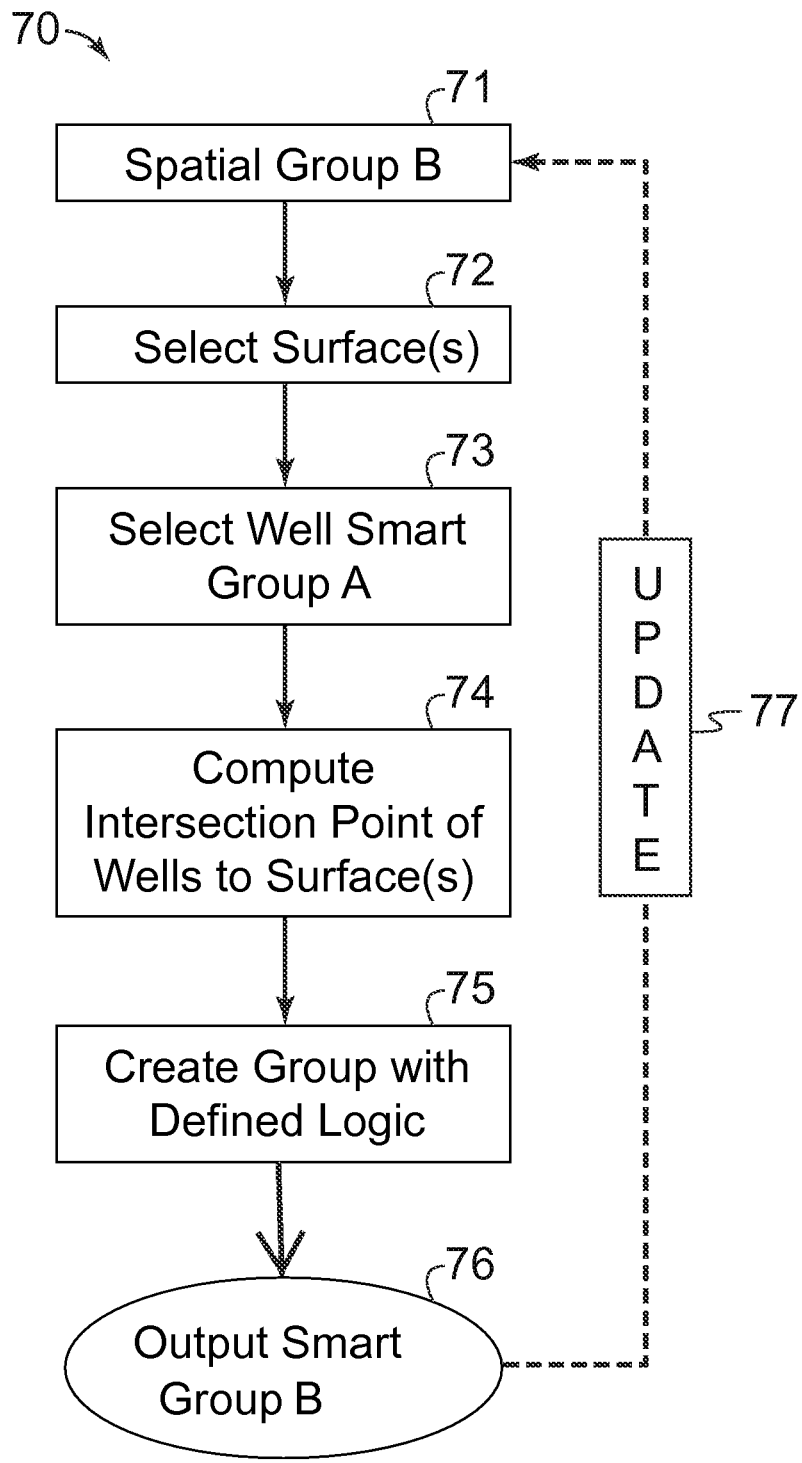
FIG. 7 is a flowchart showing a method of spatial smart group creation with two surfaces.
Figure 8:
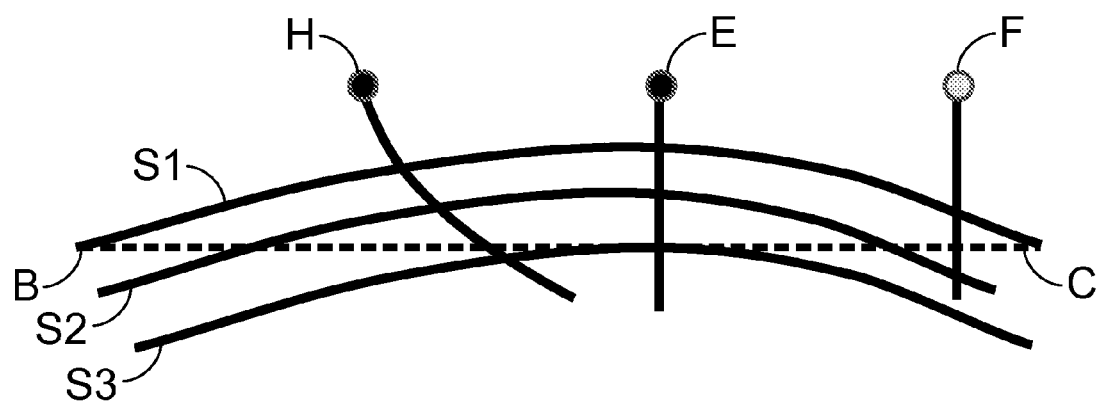
FIG. 8 is a side elevational view of a subsurface formation.
Figure 9:
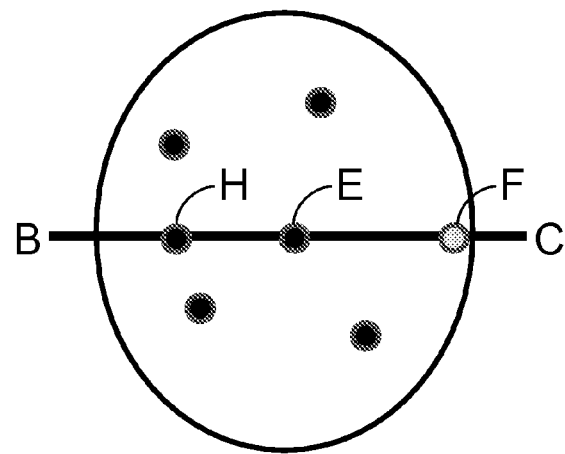
FIG. 9 is a top plan view of a cross-section of the subsurface formation of FIG. 8 taken along the line B-C.

FIGS. 7-9 show an example of creating a spatial smart group B based on wells intersecting two reservoir surfaces. When multiple surfaces are selected for smart group creation, a user can choose to return wells that intersect any or all user-defined surfaces. Additionally, a user can elect to include all or any previously defined smart groups of wells as a criterion to create an additional smart group. More specifically, the method 70 of FIG. 7 includes steps to: define and create a spatial group B (block 71); select one or more surfaces of interest (block 72), such as surfaces S1 and S3 in FIG. 8; select a previously created smart group, such as smart group A (block 73); compute or determine the logical intersection of the wells in smart group A and the selected surfaces (block 74); using the defined logic to create smart group B (block 75); and output smart group B (block 76). In block 75 the user defined smart group logic returns all wells in smart group A (as defined in FIGS. 1-3) that intersect surfaces S1 and S3 (FIG. 8). Before creating smart group B, the user may elect to display or preview the results of this logic using computer software. A preview of the results of this example, shown in FIGS. 8 and 9, would show that wells E and G satisfy the spatial condition but well F does not. Similar to the previous example where moving or otherwise modifying polygon P resulted in an update of smart group A, if surfaces S1 or S3 are moved, regenerating the smart group would recalculate the intersections and may update or modify the group's well population (block 77). Other smart group logic conditions for surfaces and wells could include finding all wells that end between two surfaces, wells that intersect some surfaces but not others, wells within a specified distance of a surface, etc.

Figure 10:
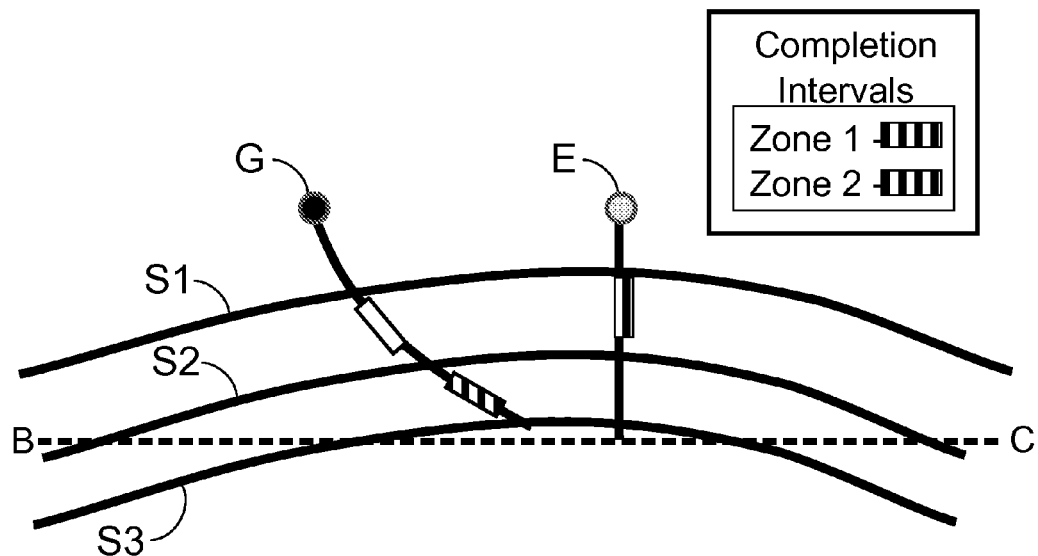
FIG. 10 is a side elevational view of a subsurface formation.
Figure 11:
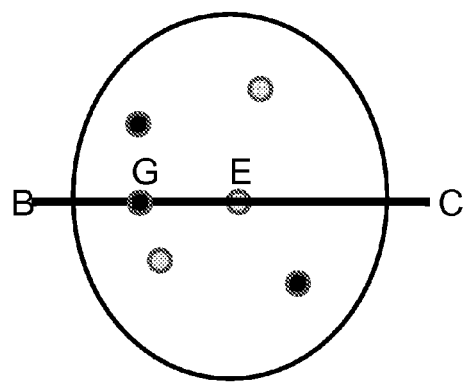
FIG. 11 is a top plan view of a cross-section of the subsurface formation of FIG. 10 taken along the line B-C.
Figure 12:
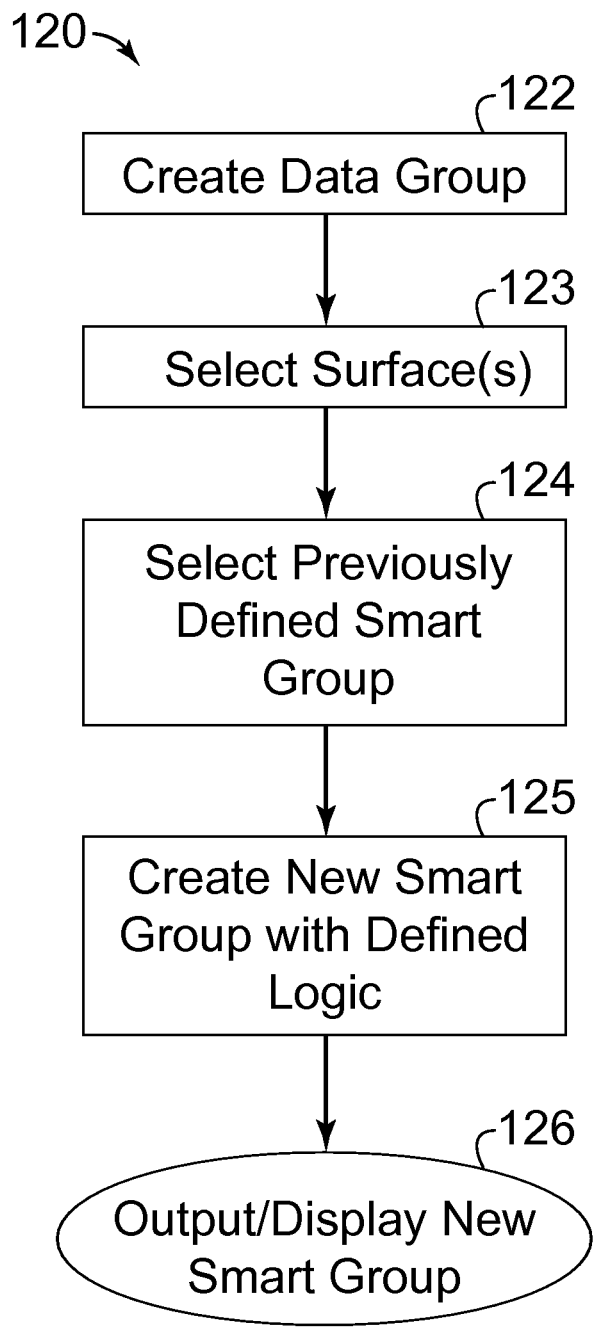
FIG. 12 is a flowchart showing a method of creating smart groups with linked domain objects.

FIGS. 10-11 depict another spatial smart group example, and specifically creating a smart group with two geologic zones (zone 1, zone 2) between three surfaces S1, S2, S3 comprising an oil reservoir. In this example, a user defines or re-defines smart group logic to find all completion intervals for wells in a previously defined smart group B existing between surfaces S2 and S3 of the oil reservoir. This logic returns zone 2 hydrocarbon completion intervals where wellbore perforations allow oil to flow out into the wellbore and up to the surface. Wells completed into zone 2 are shown as black circles in the map view of FIG. 10, while the wells that were not completed into zone 2 are shown as gray circles. However, zones could also represent any reservoir interval, operating interval, completion interval, zone, etc. An extension of this example is defining smart group logic to find zones whose top or base is outside the well surface intersection, but within a threshold distance above or below the surface top or base surface. FIG. 12 depicts a method 120 of creating a smart group with linked domain objects. At block 122 a data group is created from data available to the user. At block 123 one or more surfaces are selected, such as surfaces S2 and S3 in FIG. 11. At block 124 a previously defined smart group is selected such as smart group B. At block 125 a new smart group is created based on the logical intersection of the selected surfaces and the previously defined smart group. At block 126 the new smart group, smart group C, is displayed, outputted or stored according to need or convenience.

The spatial smart group conditions described above could be inverted to return surfaces penetrated by wells, polygons penetrated by wells, or surfaces bounding zones. This may be accomplished by switching the selection order of polygons and wells, which would be shown in FIG. 1 as a switching of blocks 13 and 15 in method 10. Additional spatial smart group conditions could be based on the interaction of any three-dimensional domain object with any other domain object including but not restricted to points, lines, surfaces, wells, wellbores, zones, completions, directional surveys, geologic models, simulation models, etc. Methods for generating spatial conditions from multiple domain objects include intersection, distance, containment within an area or volume, etc. These methods could be extended to include thresholds around each condition.

In addition to spatial queries, smart groups can be based on data, information or attributes linked to or associated with domain objects, such as the name and/or type of domain object, child object name and/or type, spatial location, available attributes, attribute values, values of data associated with the object, metadata, association with other groups, production data, and the like. Some examples of operations that might be performed on either individual objects within a group, or to the entire membership of a group, include but are not limited to a) visualization, b) changing visualization attributes such as color, c) deleting, d) exporting, and e) using all objects in a subgroup as input to an operation. One example of smart groups based on associated or linked data, shown in FIGS. 13-15, is grouping wells based on production data. While production data typically is stored in tables such as that shown in FIG. 15, the data can also be stored with or linked to the appropriate well. Referring to FIG. 13, a user may elect to create a dependent or smart sub-group, which comprises wells in a previously defined smart group whose cumulative production is greater than a predetermined threshold. The user may be presented with a dialog box on a computer screen or other display device wherein the user may specify the data group from which the smart group will be formed (block 131), the production data to include (block 132), a previously created smart group (block 133), the logic to select the appropriate wells or completions, and the attribute for the condition (e.g. cumulative oil), and the value or cutoff criteria of the attribute (block 134). Additionally or alternatively, the user may use an attribute such as a specific date or date range associated with the production data under consideration. At block 135 the new smart group is created and outputted. In the example shown in FIGS. 14 and 15, the user has chosen to investigate the wells in previously defined smart group B with cumulative oil production greater than 100 million barrels of oil (MBO). The four wells that have produced more than 100 MBO (i.e., wells 1, 4, 5 and 6) are shown as black circles in the 2D map view of the wellbore bottom hole locations map in FIG. 14. As oil continues to be produced from the reservoir and monitored in the application, this new smart group can be updated dynamically following the importing of updated production data.

Since domain objects can represent either static or dynamic objects, an extension of the previous example would be to have the queries return time-dependent smart groups based on the valid dynamic domain object time instances. Following the previous example, assume one year of monthly production data is available to be analyzed. A user wants to see which wells produce more than 100 barrels of oil each month. Using time-dependent smart groups, a smart group would be created with twelve valid time instances, one per month, containing the wells producing more than 100 barrels of oil. A prerequisite for time-dependent smart groups would be to maintain a list of valid times for each domain object. In this example, the condition is evaluated at each valid time instance, and group membership is defined as the wells satisfying the condition at each valid time. Even though an object may be included within a smart group at one time instance, it may be excluded from the smart group at another time instance based on the specified conditions of the smart group. For example, if a well produces 110 barrels of oil in January and less than 100 barrels of oil in all other months of the given year, the well would appear only in the smart group with the January time instance.

Figure 16:
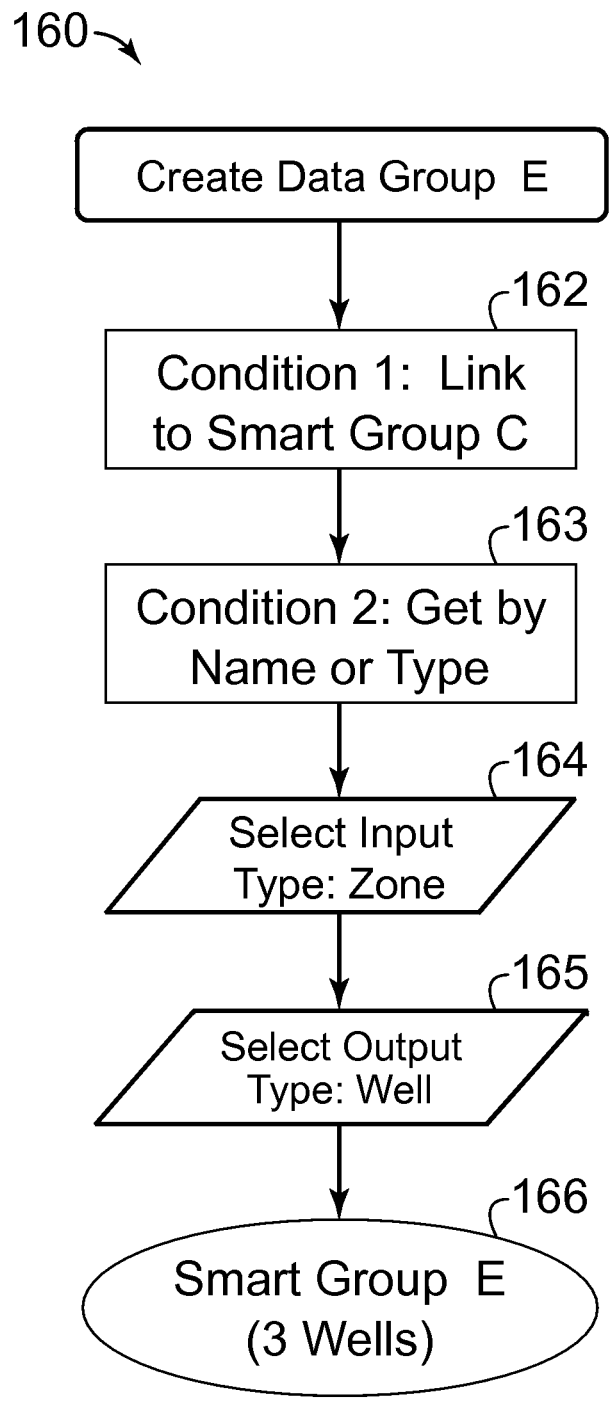
FIG. 16 is a flowchart showing a method of smart group creation with linked domain objects.

An additional feature associated with the use of linked domain objects is that smart groups can be created from domain objects linked to the subject of the condition. In general, smart groups can be created from any domain object, attribute, table, list, or other item linked to any other domain object. For wells, additional domain objects representing well logs, zones, pipes, core photos, hole sizes, zones, completions, and the like can be linked with the well domain objects. For example, FIG. 16 illustrates a method of using linked domain objects in smart groups. In this example the user elects to develop a smart group for wells from a set of specified linked domain objects such as perforations.

FIG. 16 illustrates a method 160 to create a smart group containing all wells from the example shown in FIGS. 10-11. According to method 160, condition 1 is a link to a group or smart group (block 162). For condition 2, the user selects the name, or portion of a name, and type of the linked objects to be included in the condition (block 163). In this case, the user would select a zone input type (block 164) and a well output type (block 165). In condition 2, the user also chooses to use only objects returned from previous conditions. These two linked conditions would produce, upon execution, smart group E containing 3 wells (block 166), which are indicated as dark circles in FIGS. 10 and 11.

Figure 17:
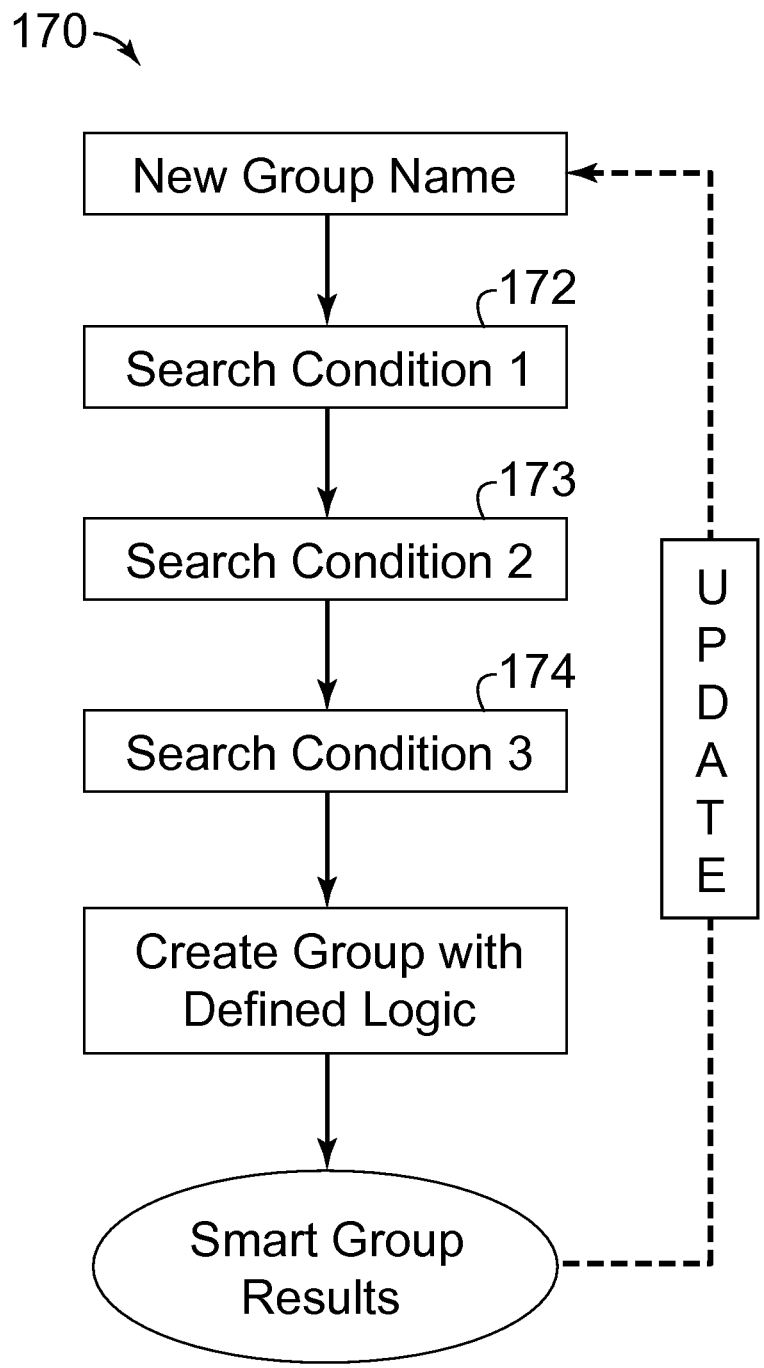
FIG. 17 is a flowchart showing a method of updating smart group creation.

As illustrated by the previous examples, a smart group can be based on any type of logic condition such as spatial, attribute, state or relationship information of a domain object. Another logic condition that may be used is a time range. A user may specify a beginning time and an ending time, which may create a closed time range (definite beginning and ending times), an open time range (one of the beginning and ending times is definite and the other is infinite), or a single point in time (identical beginning and ending times), all of which may be considered to be time ranges. The logic conditions are fully customizable by a user. A smart group may also be composed of multiple conditions linked together, as shown in blocks 172-174 of the method 170 depicted in FIG. 17. Each condition checks whether a domain object matches the condition's logic. Several conditions may be tied together with simple Boolean logic operations AND, OR, NOT and users may define how the conditions are tied together to determine what domain objects will be included in the smart group. Rather than combining results in a chain, all results returned from all previous conditions are available for each condition. For example, one or more logic conditions may be directed to output their filtered results to a temporarily created results set, which may then be used as an input to another logical condition. In such a case, the results set may contain results that have been filtered by different logic conditions but not all logic conditions. Alternatively, each logical condition may be directed to use as its input all or a selected subset of domain objects. In this way, one smart group could contain all well logs and all zones for the same subset of wells.

Smart groups do not replace the traditional manually-defined hierarchical folder-type groups. Even with smart groups, users may still want to manually organize their data, such as groups of wells. Smart groups can include members of a manually-defined group. When such a manually-defined group is updated, the smart group whose conditions depend on that group can be dynamically updated to incorporate the change. The well selection step shown in FIG. 1 could include manually selected wells, a group of such wells, or another smart group. Additionally, unlike a traditional folder-style data organization system, including a domain object in one smart group does not prevent including the domain object in other manually-defined groups or smart groups.

Smart groups give users the power to logically organize thousands or even millions of domain objects with fully customizable, user-defined logic conditions. Smart groups may be updated dynamically so the user doesn't need to manually bring them up to date when the underlying domain objects change. Trimming lists of domain objects from thousands to hundreds or tens allows users to work more efficiently. Additionally, users can operate on subsets of domain objects. For example, users can easily delete all wellbores that have not produced any oil in the past 5 years with a smart group.

Figure 18:
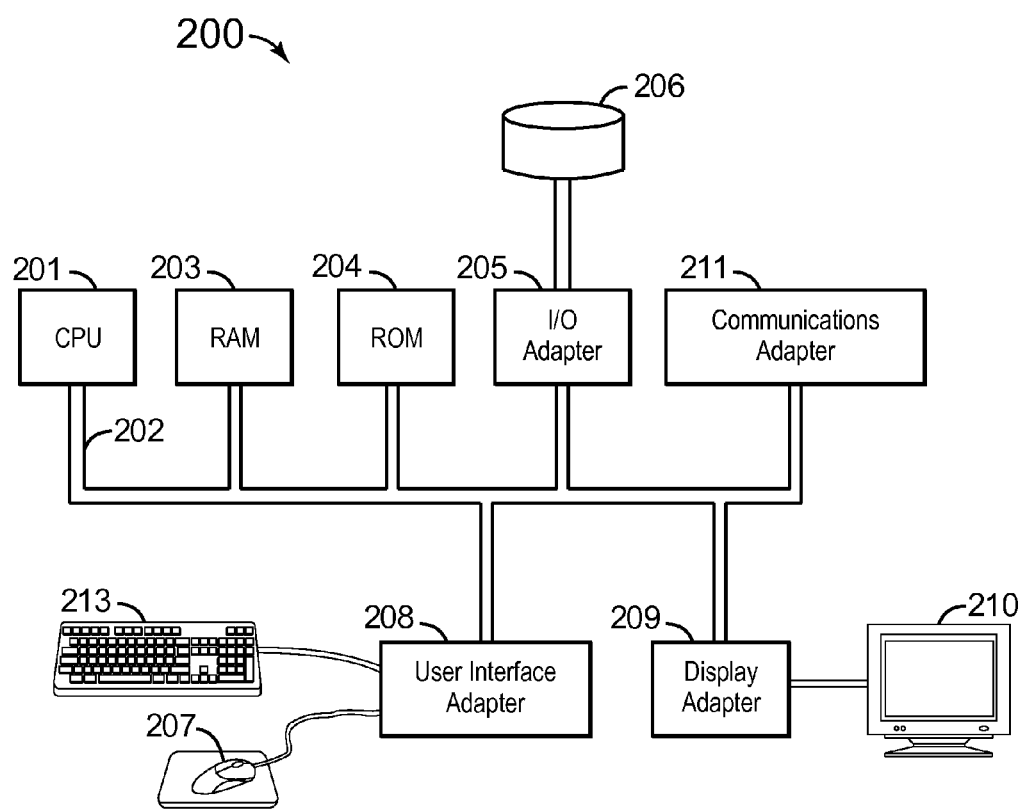
FIG. 18 is a block diagram illustrating a computing environment.

FIG. 18 is a block diagram of a computer network that may be used to perform a method for providing visualizations of data that represents a physical object according to exemplary embodiments of the present techniques. A central processing unit (CPU) 201 is coupled to system bus 202. The CPU 201 may be any general-purpose CPU, although other types of architectures of CPU 201 (or other components of exemplary system 1100) may be used as long as CPU 201 (and other components of system 200) supports the inventive operations as described herein. The CPU 201 may execute the various logical instructions according to various exemplary embodiments. For example, the CPU 201 may execute machine-level instructions for performing processing according to the operational flow described above in conjunction with any of FIG. 1, 4, 7, 12, 13, 16 or 17.

The computer system 200 may also include computer components such as a random access memory (RAM) 203, which may be SRAM, DRAM, SDRAM, or the like. The computer system 200 may also include read-only memory (ROM) 204, which may be PROM, EPROM, EEPROM, or the like. RAM 203 and ROM 204 hold user and system data and programs, as is known in the art. The computer system 200 may also include an input/output (I/O) adapter 205, a communications adapter 211, a user interface adapter 208, and a display adapter 209. The I/O adapter 205, the user interface adapter 208, and/or communications adapter 211 may, in certain embodiments, enable a user to interact with computer system 200 in order to input information.

The I/O adapter 205 preferably connects a storage device(s) 206, such as one or more of hard drive, compact disc (CD) drive, floppy disk drive, tape drive, etc. to computer system 200. The storage device(s) may be used when RAM 203 is insufficient for the memory requirements associated with storing data for operations of embodiments of the present techniques. The data storage of the computer system 200 may be used for storing information and/or other data used or generated as disclosed herein. The communications adapter 211 may couple the computer system 200 to a network 212, which may enable information to be input to and/or output from system 200 via the network 212 (for example, the Internet or other wide-area network, a local-area network, a public or private switched telephony network, a wireless network, any combination of the foregoing). User interface adapter 208 couples user input devices, such as a keyboard 213, a pointing device 207, and a microphone and/or output devices, such as a speaker(s) (not shown) to the computer system 200. The display adapter 209 is driven by the CPU 201 to control the display on a display device 210 to, for example, display information or a representation pertaining to a portion of a subsurface region under analysis, such as displaying data corresponding to a physical property of interest, according to certain exemplary embodiments.

The architecture of system 200 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

Figure 19:
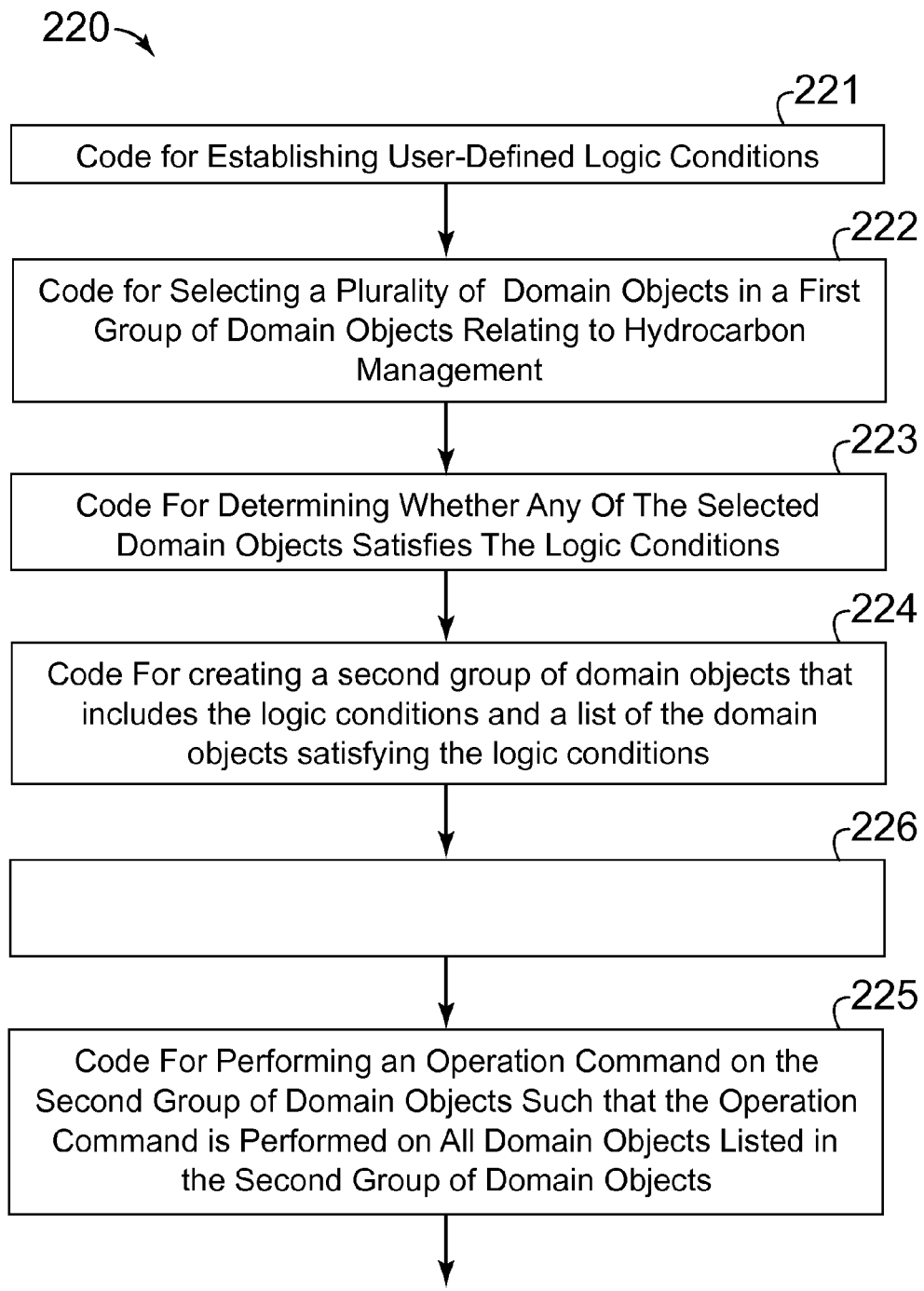
FIG. 19 is a block diagram of machine-readable code.

FIG. 19 shows a representation of machine-readable code 220 that may be used with a computing system such as computing system 200. At block 221 code is provided for establishing user-defined logic conditions. At block 222 code is provided for selecting a plurality of domain objects in a first group of domain objects relating to hydrocarbon management. At block 223 code is provided for determining whether any of the selected domain objects satisfies the logic conditions. At block 224 code is provided for creating a second group of domain objects that includes the logic conditions and a list of the domain objects satisfying the logic conditions. At block 225 code is provided for performing an operation command on the second group of domain objects such that the operation command is performed on all domain objects listed in the second group of domain objects. The operation command may include deleting, renaming, displaying, and/or modifying any part of the domain objects in the second group of domain objects or information related thereto, such as displayed color, texture, display style, metadata, and the like. Code effectuating or executing other features of the disclosed aspects and methodologies may be provided as well. This additional code is represented in FIG. 19 as block 226, and may be placed at any location within code 220 according to computer code programming techniques.

Figure 20:
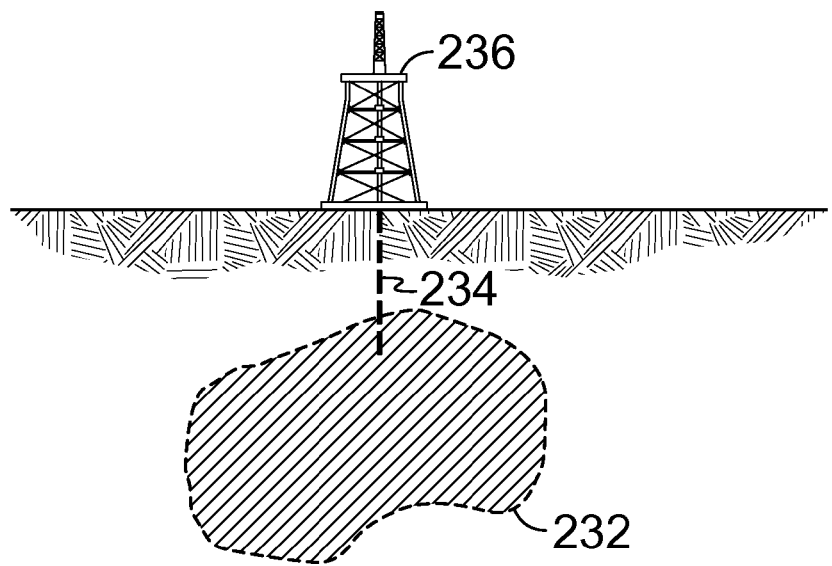
FIG. 20 is a side elevational view of a hydrocarbon management activity.
Figure 21:
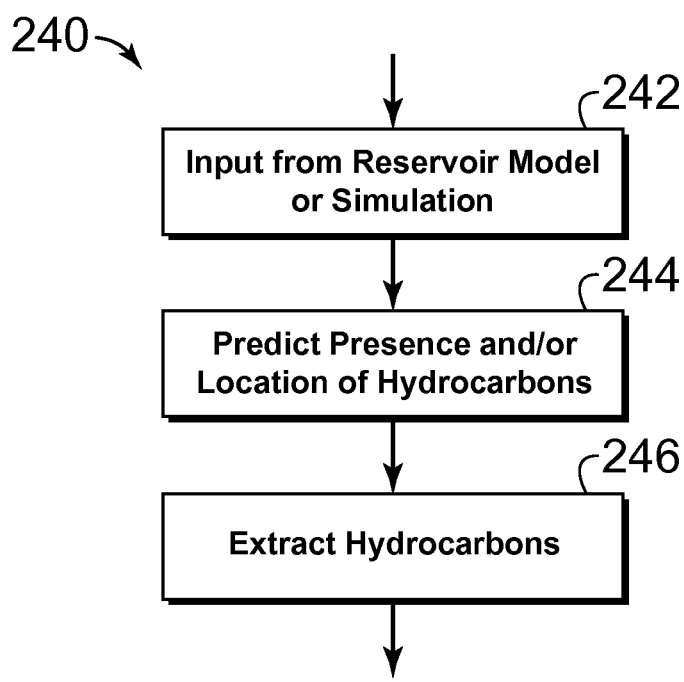
FIG. 21 is a flowchart of a method of extracting hydrocarbons from a subsurface region.

Aspects disclosed herein may be used to perform hydrocarbon management activities such as extracting hydrocarbons from a subsurface region or reservoir, which is indicated by reference number 232 in FIG. 20. A method 240 of extracting hydrocarbons from subsurface reservoir 240 is shown in FIG. 21. At block 242 inputs are received from a numerical model, geologic model, or flow simulation of the subsurface region, where the model or simulation has been run or improved using the methods and aspects disclosed herein. At block 244 the presence and/or location of hydrocarbons in the subsurface region is predicted. At block 246 hydrocarbon extraction is conducted to remove hydrocarbons from the subsurface region, which may be accomplished by drilling a well 234 using oil drilling equipment 236 (FIG. 20). Other hydrocarbon management activities may be performed according to known principles.

The disclosed aspects, methodologies and techniques may be susceptible to various modifications, and alternative forms and have been shown only by way of example. The disclosed aspects, methodologies and techniques are not intended to be limited to the specifics of what is disclosed herein, but include all alternatives, modifications, and equivalents falling within the spirit and scope of the appended claims.

What is claimed is:

1. A computer-implemented method of organizing a first group of domain objects relating to hydrocarbon management, comprising:
    establishing one or more user-defined logic conditions, wherein the logic conditions include a spatial requirement and include a graphical representation of one or more polygon, polyhedra and other geometric construct;
    selecting a plurality of the domain objects in the first group of domain objects, wherein the first group of domain objects are associated with hydrocarbon management and wherein the domain objects comprise one or more of a wellbore, a well completion, a well log, a well target, a well core, tubulars, a surface, a three dimensional model, a seismic cube, a three-dimensional surface, a well zone, a point, a point set, a polyline, and hydrocarbon management data;
    determining whether any of the selected plurality of domain objects satisfies the logic conditions;
    creating a second group of domain objects that includes the logic conditions and a list of domain objects satisfying the logic conditions; and
    performing an operation command on the second group of domain objects such that the same operation command is performed on all domain objects listed in the second group of domain objects, wherein the operation command comprises one or more of deleting, renaming, displaying, and modifying any part of the domain objects in the second group of domain objects or information related thereto.

2. The method of claim 1, wherein the logic conditions are first logic conditions, and wherein the selected plurality of domain objects are a first selected plurality of domain objects, and further comprising:
    establishing one or more user-defined second logic conditions;
    selecting a second plurality of domain objects in the first group of domain objects;
    determining whether any of the second selected plurality of domain objects satisfies the second logic conditions; and
    creating a third group of domain objects that includes the second logic conditions and a list of domain objects satisfying the second logic conditions.

3. The method of claim 1, wherein the spatial requirement is at least one of proximity to a user-defined item, inclusion in a user-defined item, and intersection with a user-defined item.

4. The method of claim 1, wherein the hydrocarbon management data comprises hydrocarbon production data.

5. The method of claim 1, wherein each of the domain objects in the first group of hydrocarbon-related domain objects has an attribute associated therewith, and wherein determining whether the one or more of the selected domain objects satisfies the logic conditions comprises comparing an attribute value of each selected domain object with a requirement of the logic conditions.

6. The method of claim 1, further comprising:
    determining whether an additional domain object has been added to the first group of domain objects; and
    including the additional domain object in the second group of domain objects when the additional domain object satisfies the logic conditions.

7. The method of claim 6, wherein the logic conditions are first logic conditions, and wherein the selected plurality of domain objects are a first selected plurality of domain objects, and further comprising:
    establishing user-defined second logic conditions;
    selecting a second plurality of the domain objects in the first group of domain objects;
    determining whether any of the second selected plurality of domain objects satisfies the second logic conditions; and
    creating a third group of domain objects that includes the second logic conditions and a list of the domain objects satisfying the second logic conditions.

8. The method of claim 7, further comprising including the additional domain object in the third group of domain objects when the additional domain object satisfies the second logic conditions.

9. The method of claim 8, wherein the second logic conditions comprise inclusion in the second group of domain objects.

10. The method of claim 1, wherein the information comprises at least one of displayed color, texture, size, style, and metadata.

11. The method of claim 1, wherein the logic conditions include a time range.

12. A computer program product having computer executable logic recorded on a tangible, non-transitory machine readable medium, the computer program product comprising:
  code for establishing user-defined logic conditions, wherein the logic conditions include a spatial requirement and include a graphical representation of one or more polygon, polyhedra and other geometric construct;
  code for selecting a plurality of domain objects in a first group of domain objects, wherein the first group of domain objects are associated with hydrocarbon management and wherein the domain objects comprise one or more of a wellbore, a well completion, a well log, a well target, a well core, tubulars, a surface, a three-dimensional model, a seismic cube, a three-dimensional surface, a well zone, a point, a point set, a polyline, and hydrocarbon management data;
  code for determining whether any of the selected plurality of domain objects satisfies the logic conditions;
  code for creating a second group of domain objects that includes the logic conditions and a list of the domain objects satisfying the logic conditions;
  code for performing an operation command on the second group of domain objects such that the same operation command is performed on all domain objects listed in the second group of domain objects, wherein the operation command comprises one or more of deleting, renaming, displaying, and modifying any part of the domain objects in the second group of domain objects or information related thereto.

13. The computer program product of claim 12, wherein the logic conditions are first logic conditions, and wherein the selected plurality of domain objects are a first selected plurality of domain objects, and further comprising:
  code for establishing user-defined second logic conditions;
  code for selecting a second plurality of domain objects in the first group of domain objects;
  code for determining whether any of the second selected plurality of domain objects satisfies the second logic conditions; and
  code for creating a third group of domain objects that includes the second logic conditions and a list of the domain objects satisfying the second logic conditions.

14. The computer program product of claim 13, further comprising:
  code for determining whether an additional domain object has been added to the first group of domain objects;
  code for including the additional domain object in the second group of domain objects when the additional domain object satisfies the first logic conditions; and
  code for including the additional domain object in the third group of domain objects when the additional domain object satisfies the second logic conditions.

15. A method of managing hydrocarbon resources, comprising:
  obtaining a first group of domain objects relating to hydrocarbon management, wherein the domain objects comprise one or more of a wellbore, a well completion, a well log, a well target, a well core, tubulars, a surface, a three-dimensional model, a seismic cube, a three-dimensional surface, a well zone, a point, a point set, a polyline, and hydrocarbon management data;
  establishing user-defined logic conditions, wherein the logic conditions include a spatial requirement and include a graphical representation of one or more polygon, polyhedra and other geometric construct;
  selecting a plurality of the domain objects in the first group of domain objects, wherein the first group of domain objects are associated with hydrocarbon management;
  determining whether any of the selected plurality of domain objects satisfies the logic conditions;
  creating a second group of domain objects that includes the logic conditions and a list of the domain objects satisfying the logic conditions;
  performing an operation command on the second group of domain objects such that the same operation command is performed on all domain objects listed in the second group of domain objects, wherein the operation command comprises one or more of deleting, renaming, displaying, and modifying any part of the domain objects in the second group of domain objects or information related thereto; and
  managing hydrocarbons based on the second group of domain objects.

16. The method of claim 15, wherein the logic conditions are first logic conditions, and wherein the selected plurality of domain objects are a first selected plurality of domain objects, and further comprising:
  establishing user-defined second logic conditions;
  determining whether any of the second selected plurality of domain objects satisfies the second logic conditions; and
  creating a third group of domain objects that includes the second logic conditions and a list of the domain objects satisfying the second logic conditions.

17. The method of claim 1, further comprising:
  adding or modifying one of the plurality of the domain objects;
  determining whether the added or modified one of the plurality of domain objects satisfies the logic conditions;
  updating the second group of domain objects if the added or modified one of the plurality of domain objects satisfies the logic conditions.

* * * * *